United States Patent [19]
Kelley et al.

[11] Patent Number: 5,810,210
[45] Date of Patent: Sep. 22, 1998

[54] MEASURED FLUID POUR METHOD AND DEVICE

[76] Inventors: Scott A. Kelley, Box 420446, Houston, Tex. 77242; Edward D. Dysarz, 11423 Triola La., Houston, Tex. 77072

[21] Appl. No.: 727,757

[22] Filed: Oct. 8, 1996

[51] Int. Cl.⁶ .......................... G01F 11/26; G04C 23/00; B67D 5/08
[52] U.S. Cl. .......................... 222/456; 222/454; 222/639; 222/644
[58] Field of Search .................... 222/454, 456, 222/639, 640, 641, 644

[56] References Cited

U.S. PATENT DOCUMENTS

| | | | |
|---|---|---|---|
| 3,178,081 | 4/1965 | Adams | 222/456 |
| 3,877,614 | 4/1975 | Murphy | 222/209 |
| 3,980,210 | 9/1976 | Kilgerman | 222/456 |
| 4,424,921 | 1/1984 | Feuerstein et al. | 222/456 |
| 4,651,907 | 3/1987 | Thomas | 222/639 |
| 4,684,045 | 8/1987 | Su | 222/456 |

*Primary Examiner*—Andres Kashnikow
*Assistant Examiner*—Keats Quinalty

[57] ABSTRACT

A measured fluid pour method and device consisting of a container such as a drinking cup, a bottle, a large fluid drum or a container of chemicals wherein a predetermined volume of fluid is poured into another vessel or into the mouth. The device is comprised of a vessel such as a drinking cup or a container such as a bottle, an inner cup of a predetermined size, a tube fixed to the inner cup and extending to the upper end of the cup or container wherein the tube is fixed to the top of the cup or container and wherein a limited volume of fluid may enter the inner cup or container and wherein when the drinking cup or container is tilted to a pouring or drinking position, and only the amount of the fluid contained in the inner cup will flow out of the drinking cup or container.

7 Claims, 4 Drawing Sheets

MEASURED FLUID POUR METHOD AND DEVICE

BACKGROUND OF THE INVENTION

There are many types of cups and containers that have various means of pouring or extracting the fluid from the cup or container however there are no devices that allow the container to be turned at an angle to allow the fluid to be poured out of the container in a predetermined quantity.

SUMMARY

It is the object of the present invention to provide a cup that will allow a person to drink liquid such as coffee or soft drink while driving a boat or car without spilling the liquid.

It is another object of the present invention to provide a liquid medication container wherein a patient will drink only a predetermined amount of the liquid.

It is yet another object of the present invention wherein chemicals such as those used in a lab for commercial use may be easily measured as they are poured into another container.

The foregoing and other objects and advantages of the present invention are attained by a measured fluid pour method and device wherein a vessel such as a cup or bottle with an inner cup and a tube extending from said inner cup to the cover or lid of the vessel wherein whenever the vessel is tilted into a pour position only the contents of the fluid contained in the inner cup will pour out of the vessel.

The features of the present invention can be best understood together with further objects and advantages by reference to the following descriptions taken in conjunction with accompanying drawings, wherein like numbers indicate like parts.

DETAILED DESCRIPTION OF THE PREFERRED EMBODIMENT

Figure 1:
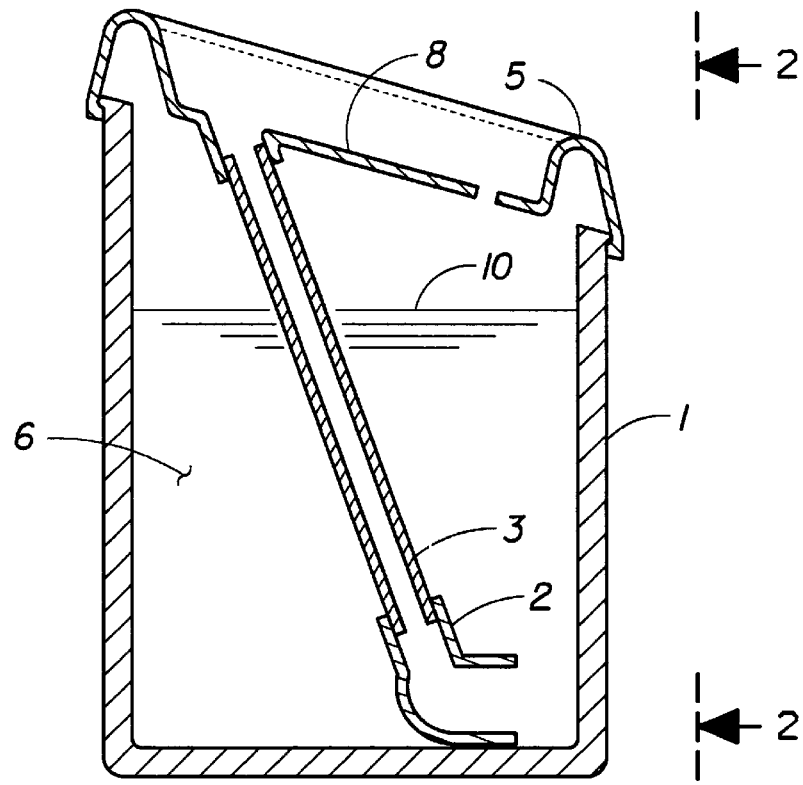
FIG. 1 is a section elevation of the device of the first preferred embodiment.

Referring to FIG. 1 there is shown a section elevation of the cup 1 of the first preferred embodiment of a measured pour device and method.

The cup 1 is shown with an upper cover 8 that is suitably sealed to the cup 1 by threads or a snap on fluid tight seal or adhesive, by design choice. A tube 3 is shown suitably fixed to the upper cover 8 by adhesive or threads or a snap on fitting by design choice. The first end of the tube 3 is shown suitably fixed to the upper cover 8. The second end of the tube 3 is shown suitably fixed to the first end of the inner cup 2 by adhesive, threads or snap on by design choice. The inner cup 2 is shown with an inside and an outside, a first end and a second end. The second end of the inner cup 2 is shown open wherein liquid 6 is allowed to flow freely into the inner cup 2 that is near the bottom of the cup 1. When the cup 1 is rotated more than thirty degrees (30°) the liquid will flow freely from the inner cup 2 through the tube 3 and over the drinking lip 5 formed in the upper cover 8. The liquid surface 10 is shown below the upper cover 8. The direction of flow is shown.

Figure 2:
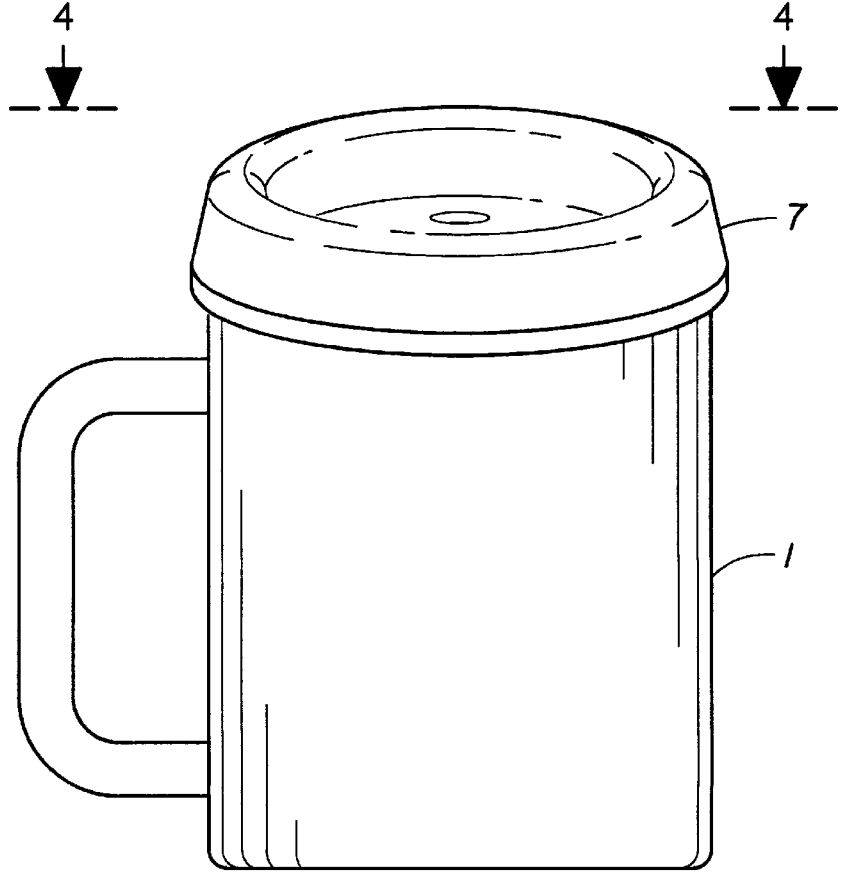
FIG. 2 is an exterior elevation of the cup of the device of the first preferred embodiment.

Referring to FIG. 2 there is shown an exterior elevation view of the cup 1 and the cup cover 7. The cup cover 7 slopes to make sufficient space for the nose while drinking and allowing one to drink without having to bend the neck backward.

Figure 3:
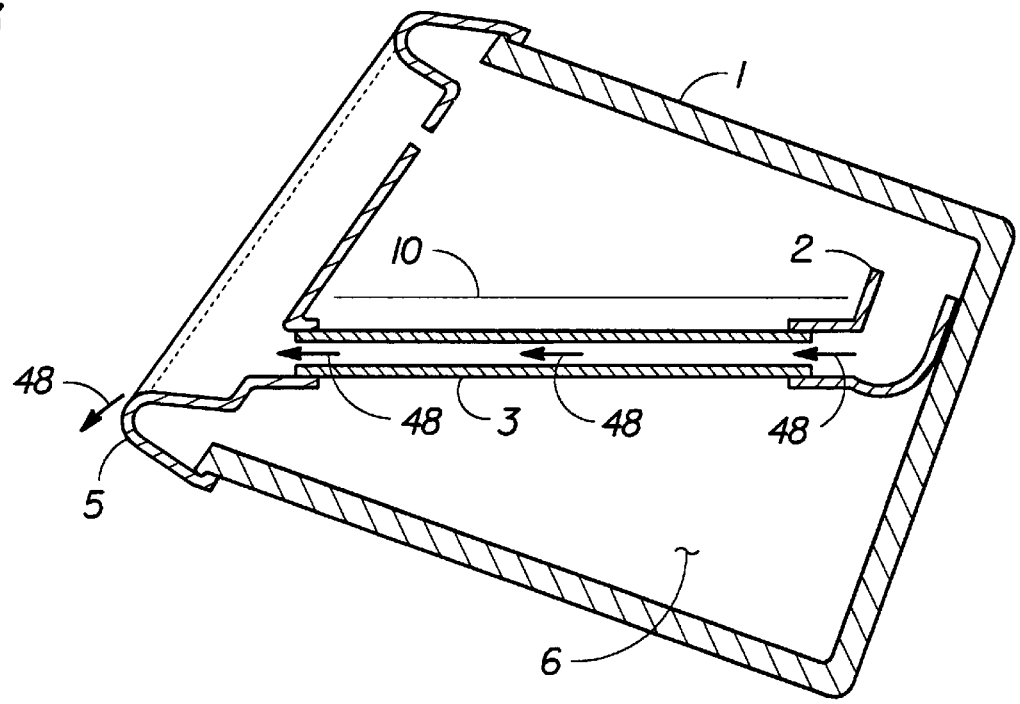
FIG. 3 is a section elevation of the first device of the first preferred embodiment in a tilted position.

Referring to FIG. 3 there is shown a section elevation of the preferred embodiment showing the cup 1 tilted in a drinking position.

The fluid in the cup 1 is shown horizontal while the cup 1 is tilted. The second end of the inner cup 2 is shown above the liquid surface 10 thereby only allowing the volume of liquid 6 contained in the inner cup 2 to flow from the inner cup 2 through the tube 3 over the drinking lip 5 and into the mouth of the person drinking. Only the amount of liquid 6 contained in the inner cup 2 is allowed to flow 48 into the mouth of the person drinking and thereby restricting or eliminating an accidental spill or an accidental slosh of liquid onto the face and body of the person drinking.

Figure 4:
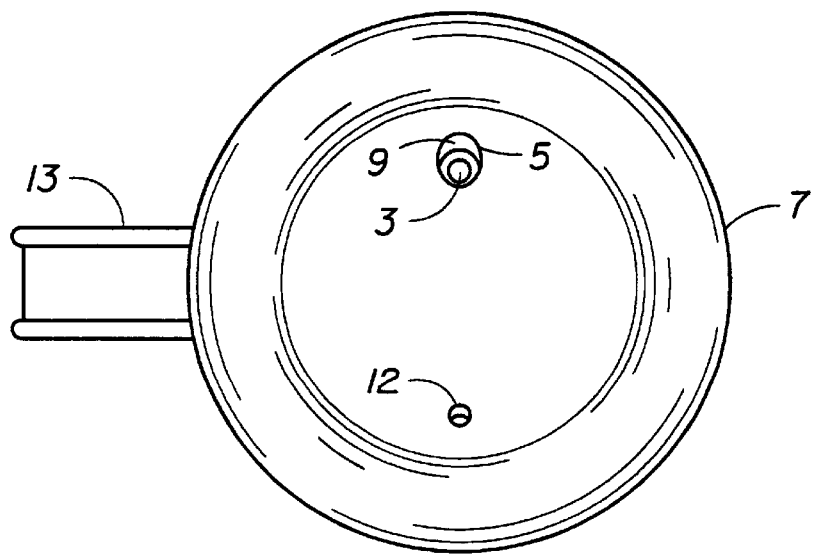
FIG. 4 is a plan view of the cup of the device of the first preferred embodiment.

Referring to FIG. 4 there is shown a plan view of the top of the cup cover 7.

The drinking orifice 9 is shown near the first end of the drinking lip 5. The drinking orifice 9 is suitably connected to the first end of the tube 3 shown with hidden lines. The air vent 12 is shown at the second end of the cup cover 7. The cup handle 13 is shown at the third end of the cup 1. The configuration and location of the cup handle 13 is a matter of design choice.

Figure 5:
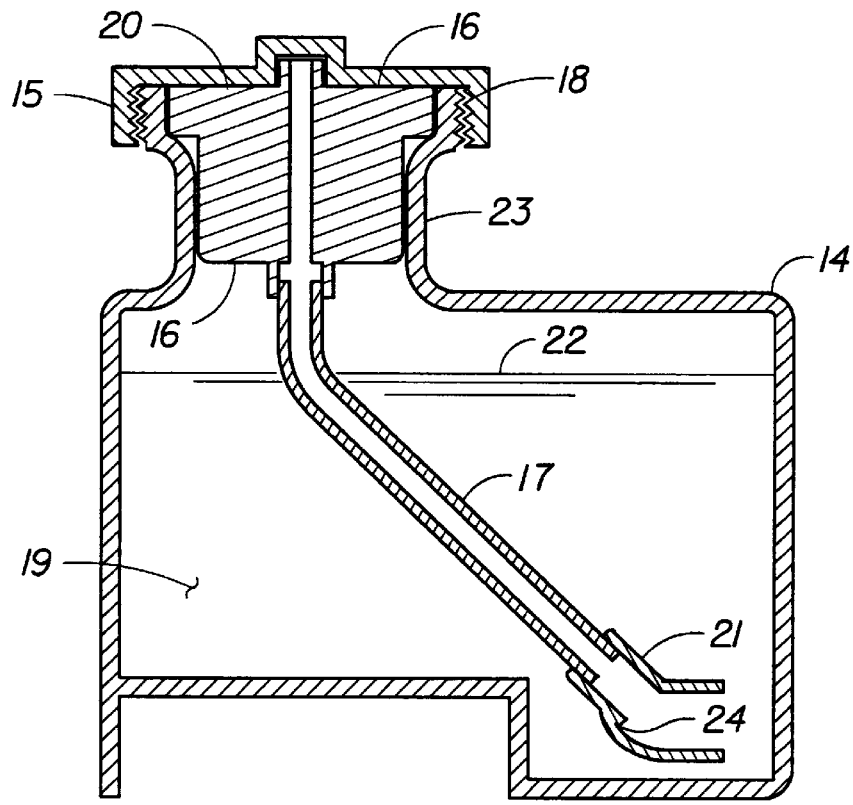
FIG. 5 is a section elevation of the device of the second preferred embodiment showing the device in a bottle.

Referring to FIG. 5 there is shown a section elevation of the device 20 of the second preferred embodiment.

A bottle 14 is shown with a top end and a bottom end. A bottle extension 23 is shown integral with the bottle 14 at the top end of the bottle 14. A bottle cap 15 is shown suitably connecting the top of the bottle extension 23 at the first end of the bottle extension. The bottle cap 15 is suitably fixed to the bottle extension by threads 18 or other suitable means such as a snap on method or adhesive by design choice.

The inner container 21 is shown inside of the bottle 14 in the sump 47. The sump is an area of reduced size in the bottom end of the bottle to contain the remaining liquid when the bottle is nearly empty. The inner container 21 is formed into a cup to hold a limited quantity of fluid inside of the bottle 14. The first end of the inner container 21 is shown suitably fixed to the second end of the bottle tube 17 and the first end of the bottle tube 17 is suitably fixed to the snap on stop plug 16 and further extends through the snap on stop plug 16 and into the bottle cap 15. The bottle cap 15 is shown with threads 18 to allow the bottle cap 15 to be suitably fastened to the bottle extension 23.

The liquid surface 22 is shown perpendicular to the first side and second side of the bottle 14.

Figure 6:
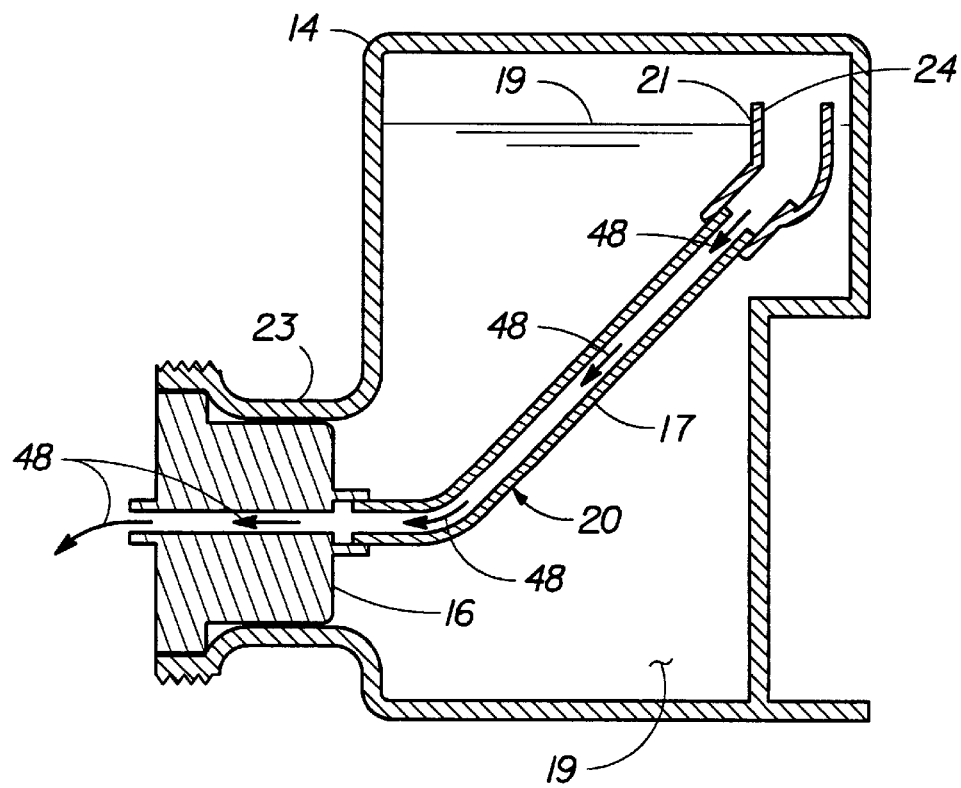
FIG. 6 is a section elevation view of the device of the second preferred embodiment showing the device in a tilted or pour position.

Referring to FIG. 6 there is shown a section elevation of the device 20 in a pour out position.

The bottle cap has been removed and the bottle 14 has been rotated into a pour position. The liquid 19 surface is now perpendicular to the upper side and the lower side of the bottle 14. The bottle tube 17 and the inner container 21 will further not allow any other fluid in the bottle 14 to enter or flow 48 over the inner container walls 24. The inner container 21 is made to contain a predetermined quantity of liquid and therefore only pour a predetermined quantity of liquid 19.

The snap on stop plug 16 is shown preventing any liquid not contained in the inner container from pouring out. The snap on stop plug 16 forms a fluid tight seal between the inner surface of the bottle extension 23 and the outer surface of the snap on stop plug 16.

Figure 7:
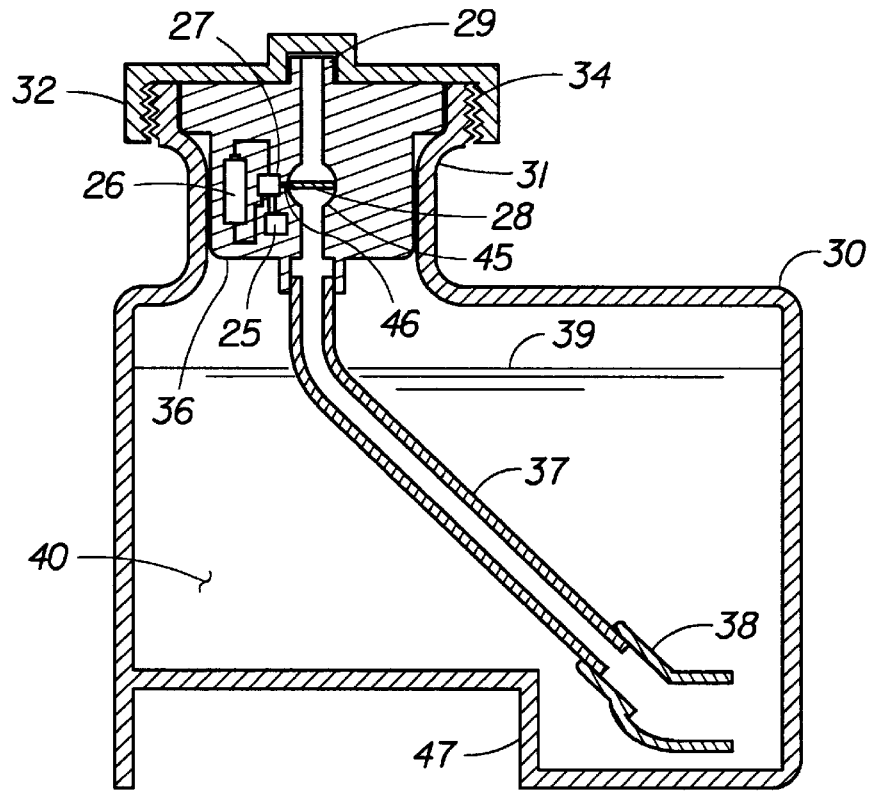
FIG. 7 is a section elevation of the device of the third preferred embodiment with a timing device and a control valve.

Referring to FIG. 7 there is shown a section elevation of the third preferred embodiment with a timer means 25 and control valve 28.

Often when medication is given to a patient, the medication must be dispensed at predetermined times and in predetermined quantities, however the patient receiving the medication most likely will forget the time and amount of the medication required.

The control device of the third preferred embodiment has at least one power means 26, such as a battery or other device by design choice, a timer means 25, an actuator means 27 that is connected to a valve 28, by a valve shaft 46.

The timer means 25, the power means 26, the actuator means 27 and the control valve 28 are all contained in the snap in plug 36 that is either snapped into the inside surface of the bottle neck 31 or threaded into the inside surface of the bottle neck 31 or held in the inside surface of the bottle neck 31 by a suitable adhesive by design choice. The timer means 25 can be either pre-set and sealed in the snap in plug 36 or it could have at least one dial or time adjustment device that is common by design choice. The power means 26 could be a replaceable battery or a rechargeable power device by design choice. The actuator means 27 could be an electrical, hydraulic, or pneumatic power device by design choice. The control valve 28 shown is a ball valve but it could be a gate valve or any other type of valve by design choice.

The inner container 38 is shown in a sump 47 at the bottom of the bottle 30 wherein there is only one inlet at the first end of the inner container 38 that will allow liquid 40 to enter. The second end of the inner container 38 is shown suitably fixed to the first end of the bottle tube 37. The second end of the bottle tube 37 is shown suitably connected to the first end of the control valve housing 41. The second end of the control valve housing 41 is shown suitably connected to the first end of the spout 29. The second end of the spout 29 extends past the snap in plug 36 and past the second end of the bottle neck 31 to allow the liquid 40 to be poured without spilling or to allow a person to drink through a straw like device.

A cap 32 is shown suitably fixed to the second end of the bottle neck 31 by threads 34 which will allow the bottle 30 to be opened or closed as desired.

The liquid surface 39 is shown near the second end of the bottle 30 because the bottle 30 is in an upright position. The control valve 28 is closed, the orifice 45 is shown seen as a circle and therefore liquid would not be able to flow through the control valve 28.

To open or close the control valve 28, the timer means 25 commands the actuator means 27 to open or close the control valve 28 with energy from the power means 26.

Figure 8:
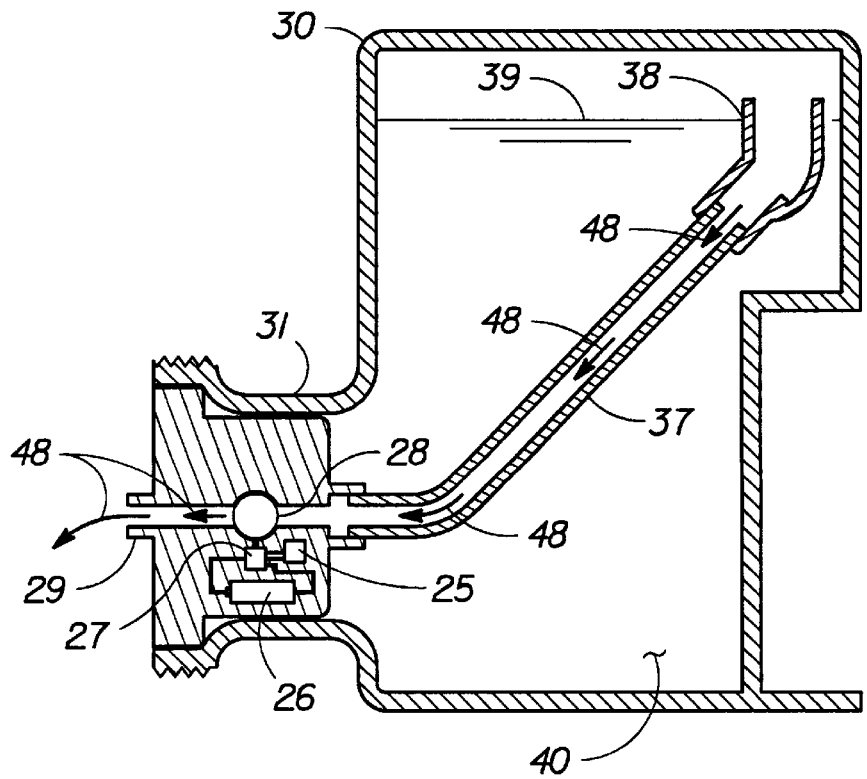
FIG. 8 is a section elevation of the device of the third preferred embodiment with an electric timer in a pour position.

Referring to FIG. 8 there is shown a section elevation of the bottle 30 in a pour position. The cap has been removed and the spout is shown extending past the second end of the bottle neck 31. The control valve 28 is shown in an open pour position.

The liquid surface 39 is shown extending from the first end of the bottle 30 to near the second end of the bottle 30, and only the liquid 40 contained in the inner container 38 will be allowed to flow through the bottle tube 37, through the orifice 45 and through the spout 29 wherein it will be consumed. When the bottle 30 is set upright the timer means 25 will command the actuator means 27 to close the control valve 28 thereby not allowing more liquid to flow until the timer means 25 energizes the actuator means 27 which in turn will open the control valve at a predetermined time. The direction of flow 48 is shown to indicate the liquid 40 pouring out.

Although the system described in detail supra has been found to be most satisfactory and preferred many variations are possible. For example there could be two chambers in the bottle with a separate system in each chamber wherein the contents are mixed as they pour out of each chamber.

Although the invention has been described with reference to the preferred embodiments, it will be understood by those skilled in the art that additions, modifications, substitutions, deletions and other changes not specifically described may be made in the embodiment herein, it should be understood that the details herein are to be interpreted as illustrative and are not in a limiting sense.

What is claimed as invention is:

1. A measured pour device that will measure and control the amount of a fluid that is poured from a cup with an inside, an outside, a first and a second end comprising:

an inner cup with a first end and a second end wherein said inner cup is opened at the first end and wherein said inner cup is located near said first end of said cup;

a tube with a first end and a second end wherein said first end of said tube is fixed to said second end of said inner cup;

a cup cover wherein said cup cover has a drinking lip formed on said cup cover and said drinking lip further has a drinking orifice formed in said drinking lip and wherein said second end of said inner cup is fixed to said first end of said tube and said second end of said tube is fixed to said drinking lip wherein said inner cup located near said first end of said cup is filled with said fluid and wherein said cup is rotated into a drinking position, said fluid contained in said inner cup flows from said inner cup into said tube and fluid further flows from said tube and through said drinking orifice formed in said drinking lip and out of said drinking orifice and wherein when said cup is rotated into said drinking position and said first end of said inner cup is above the surface of said fluid and wherein said fluid cannot flow into said inner cup until said inner cup is rotated away from said drinking position thereby controlling the volume or fluid that can be poured from said cup at one time.

2. The measured pour device of claim 1 wherein said cup cover is sloped at one end to clear the nose of a person drinking from said cup.

3. A measured pour device that will measure and control the amount of fluid that is poured or drank from a container with an inside, an outside and a first end and a second end and a bottle extension formed near said second end of said container comprising:

an inner container with a first end and a second end wherein said inner container is open at said first end and wherein said inner container is located near said first end and inside of said container;

a bottle tube with a first end and a second end wherein said first end of said bottle tube is fixed to said second end of said inner container;

a snap-on stop plug wherein said snap-on stop plug has a first side and a second side and wherein a hole is formed in said snap-on stop plug that extends from said first side to said second side and wherein said snap-on stop plug is disposed in said bottle extension formed in said container and wherein said snap-on stop plug forms a fluid tight seal with said bottle extension and wherein said bottle tube is disposed through said hole formed in said snap-on stop plug and wherein said bottle tube extends past said snap-on stop plug further forming a spout and wherein when said container is in an upright position said inner container is filled with said fluid and wherein said container is rotated, said inner container will be above the fluid surface and only the contents of fluid contained in said inner container will be allowed to pour out of said bottle tube and therefore limit the volume of said fluid that will be poured or drank from said container.

4. The measured pour device of claim 3 wherein said bottle tube is covered inside of said bottle.

5. A measured pour device that will measure and control the volume of fluid that is poured or drunk from a bottle at a predetermined time to prevent an excessive quantity of fluid from being consumed or applied wherein said bottle has a top, a bottom an inside an outside and a bottle neck comprising:

an inner container with a first end and a second end wherein said inner container is open at said first end to allow said fluid to flow into said inner container contained in said bottle and wherein said inner container is near said bottom of said bottle;

a bottle tube with a first end and a second end wherein said first end of said bottle tube is fixed to said second end of said inner container;

a valve case with a first end, a second end, a first side and a second side wherein a first hole is formed at said first end and a second hole is formed at said second end and a third hole is formed at said third side wherein said first end of said valve case is fixed to said second end of said bottle tube end;

a spout with a first end and a second end wherein said first end of said spout is fixed to said second end of said valve case;

a control valve wherein said control valve is round and said control valve has an orifice formed in said control valve and wherein said control valve is disposed in said valve case and wherein said control valve forms a fluid tight interface between said control valve and said valve case and wherein when said control valve is in an open position, fluid may flow from said bottle tube, through said orifice and into said spout and when said control valve is in a closed position, fluid may not flow through said orifice therefore stopping all fluid flow from said bottle tube to said spout;

a valve shaft with a first end and a second end wherein said second end of said valve shaft is fixed to said control valve and said valve shaft is further disposed through said third side of said valve case;

an actuator means wherein said actuator means is fixed to said valve shaft and said actuator means can rotate said shaft and said control valve fixed to said shaft wherein said control valve can be rotated to an open or closed position;

a timer means wherein said timer means opens and closes said valve at predetermined times;

a power means wherein said power means will supply energy to said timer means to enable said timer means to function and further said power means supplies energy to said actuator and actuates said valve shaft to open and close said control valve;

a snap-on plug with a first side and a second side and said snap-on plug further has a hole formed in said snap-on plug that extends from said first side to said second side, and wherein said snap-on plug is fixed to said inside of said bottle neck forming a fluid tight connection between said snap on plug and said inside of said bottle neck and wherein said second end of said bottle tube also forms a fluid tight connection to prevent fluid flow around said bottle tube, said valve case and said spout thereby allowing said inner container to be filled with fluid, wherein said bottle to be rotated into a pour position only, and wherein only said fluid contained in said inner container will flow through said bottle tube, through said orifice formed in said control valve and into said spout if said control valve is open, if said timer means commands said actuator to close said control valve, said fluid will not flow.

6. The measured pour device of claim 5 wherein said power means, said timer means, said actuator means, said valve case and said control valve are contained in said snap-on plug.

7. The measured pour device of claim 5 wherein said bottle neck has threads and wherein a cap may be placed on the top of said bottle neck.

* * * * *